Potato Digger.
Patented Oct. 11, 1853.
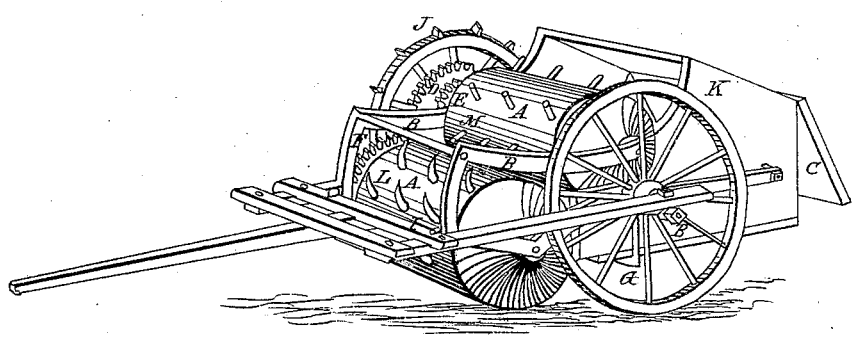

UNITED STATES PATENT OFFICE.

S. SNOW, OF FAYETTEVILLE, AND A. HINE, OF LA FAYETTE, NEW YORK.

ROTARY ROOT-DIGGING CULTIVATOR.

Specification of Letters Patent No. 10,113, dated October 11, 1853.

*To all whom it may concern:*

Be it known that we, SAMUEL SNOW, of Fayetteville, and ALEXANDER HINE, of La Fayette, in the county of Onondaga and State of New York, have invented a new and useful Implement or Machine for Cultivating Arable and Tilled Lands and Clearing them of the Roots of Thistles, Quack-Grass, and other Noxious Weeds; and we hereby declare that the following is a full, clear, and exact description of the same, reference being had to the annexed drawing, making a part of this specification.

Said drawing represents a perspective view of said implement or machine showing its several parts distinctly lettered, and which we describe as follows:

A, L, is a large front lower cylinder, with ends spiral or elliptical near the axis, in the outer cylindric surface of which are inserted, in regular order, any suitable number of pointed and bent or hooked teeth, represented by L and its corresponding indications. A, M, is another large back upper cylinder, with a like number of straight and blunt teeth set in its outer cylindric surface in regular order, so as to move between the teeth of the other cylinder, as represented by M and its corresponding indications. B, and B, are two corresponding vertical side frames or open sections, which are stayed and held in place by the axle-tree of the cart, or carriage, passing through the lower central part thereof, and by transverse cross-bars or rods passing horizontally through the front and back ends of each, holding the two corresponding ends of each equi-distant and together; which two vertical sections are pierced by the axis of the cart, on which they rest and around which they partially revolve, on the inner side close to the respective holes of the two wheels. They are also pierced at different points with corresponding holes for the axis of each of the two aforesaid cylinders, in which they are severally inserted and made to revolve.

K is a large box, with an open front toward the two cylinders and lies between the back end of said two vertical sections, and rests its front part on the bent axle of the cart, and its rear end is supported by the cross bar or rod which unites and secures the back end of the aforesaid two vertical sections, which cross-bar or rod may pass through said box, or be bent like said axle, and thus made to pass under said box.

C is a lid or door hung with butts and screws to the rear end of said large box, so as to be opened and shut at pleasure.

D is a segment, or visible part of a large double-cogged wheel, with cogs inserted or cut in both its outer and inner cylindric surfaces, or rims; which wheel is permanently attached and made fast to the spokes of one of the wheels of the cart or carriage; by whose revolutions, with those of the wheel, the two cylinders are made to revolve.

F is the segment or visible part of another, (single) cog-wheel, which is permanently attached to one end of the axle of the large front, lower cylinder A, L, and unites with the cogs on the outer cylindric surface of the double-cogged wheel D, by which it is moved, and moving causes said cylinder to revolve.

E is a segment, or the visible part of another single cog-wheel, which is permanently attached to one end of the axle of the cylinder A, M, which unites with the cogs on the inner cylindric surface of said double cogged-wheel D, by which it is moved, and moving causes said latter cylinder also to revolve and move in a counter direction to that of the first aforesaid cylinder.

J is one of several similar pivots or teeth inserted in the outer surface of tire of the wheel of the cart, to which the double-cogged wheel D is attached, so as to insure at all times the rolling of said wheel, with the movement of the cart, or carriage.

G is the visible part of the axletree of the cart, so bent down between the wheel as to receive and support the box K. H is one end of said axle which first passes through one of the aforesaid vertical side frames, or open sections B and then through the hub of the wheel, and lastly through a loop or hanger, to which one arm of the frame work of the tongue of the cart or carriage is attached—the two ends of which axle are similar.

I is one of two small movable screws or pins inserted in holes in the front end of each of the two vertical side frames, or open sections B and B, and which rest on the back cross bar of the frame work of the tongue of the cart, by means of which said side frames and front cylinder are elevated or depressed at pleasure, so as to cause the teeth of said cylinder to run any desirable depth the user may please. The wheels of said cart or carriage and on which the whole machinery is moved, we construct similar to those of any ordinary cart; and said tongue and the frame work and arms thereof similar to those used on the common field roller; but claim neither as constituting any part of our said invention; except in their aforesaid combination with other parts of our said machine.

Said implement or machine being thus constructed the same operates as follows: We attach the team to the tongue of said cart of carriage in the ordinary manner; and as the wheels are moved the double-cogged wheel D, being attached to one of them, is made to move and revolve therewith. The cogs in its outer cylindric rim or surface, uniting with the cogs in the like outer surface of the wheel E, causes that to revolve, which being permanently attached to one end of the axle of the cylinder A L, causes that to revolve with a backward and under motion, whereby the pointed hooked teeth inserted therein dip in the earth and catch up and carry forward and over said cylinder the roots of thistles, grasses, and noxious weeds which lie on or bedded in the ground, until they are brought up and back on the back side of said cylinder, when they are seized and thrown off and back into the box K by the blunt straight teeth of the other cylinder A M, which is operated by the cog wheel E, moved by the cogs on the inner cylindric surface of the double cogged wheel D, which gives said latter cylinder a counter revolving motion. Said roots, &c., being thrown back into said box are taken therefrom through the lid or door C, with a hoe or rake as often as occasion may require. We construct said cylinders, cog-wheels, and other parts of said implement or machine of wood or any metallic substance, or in part of both combined as may best suit our taste and convenience and that of others.

What we claim as our invention and desire to secure by Letters Patent of the United States, is—

The combination of the two toothed cylinders with the receiving box, all being arranged and suspended on an adjustable frame in the manner and for the purpose set forth.

SAMUEL SNOW.
ALEXANDER HINE.

Witnesses:
N. R. CHAPMAN,
I. N. MEAD.